Figure 1:
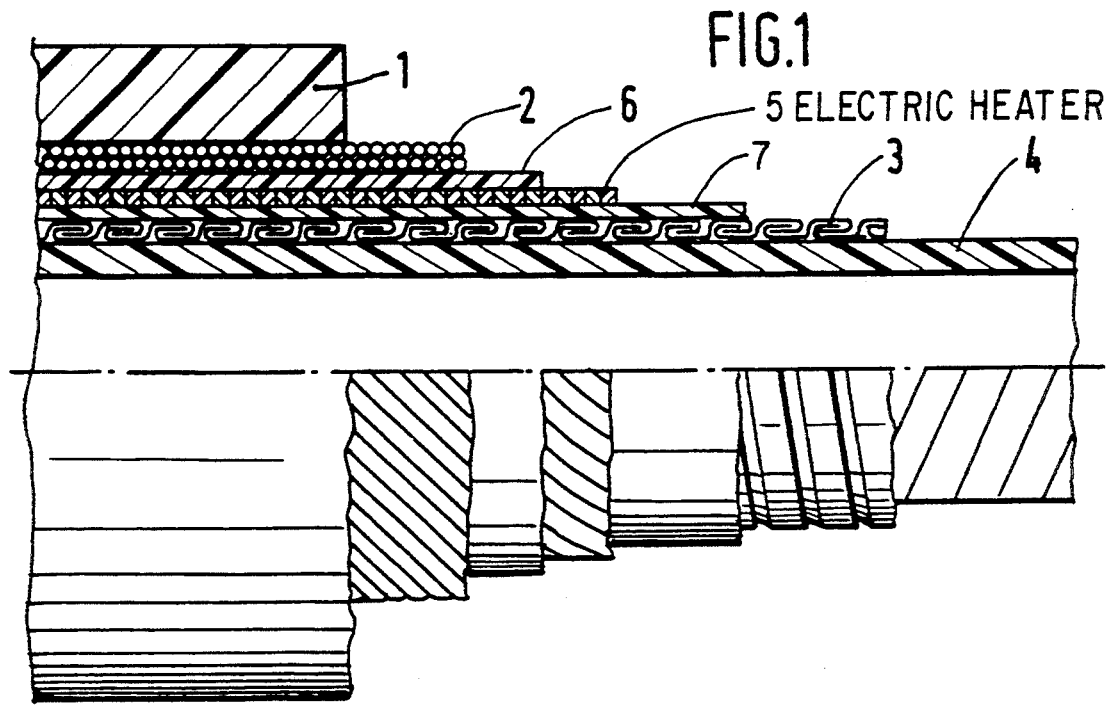

United States Patent [19]
Lequeux

[11] Patent Number: 5,428,706
[45] Date of Patent: Jun. 27, 1995

[54] FLEXIBLE TUBULAR CONDUIT WITH HEATING MEANS AND STIFFENING MEANS FOR TRANSPORTING PRESSURIZED FLUIDS

[75] Inventor: Jean-Michel Lequeux, Le Vesinet, France

[73] Assignee: Coflexip, Billanocurt, France

[21] Appl. No.: 807,858

[22] PCT Filed: May 17, 1991

[86] PCT No.: PCT/FR91/00403
§ 371 Date: Mar. 3, 1992
§ 102(e) Date: Mar. 3, 1992

[87] PCT Pub. No.: WO91/18231
PCT Pub. Date: Nov. 28, 1991

[30] Foreign Application Priority Data

May 17, 1990 [FR] France ............... 90 06186

[51] Int. Cl.⁶ .................. F16L 11/127; H05B 3/58
[52] U.S. Cl. ...................... 392/472; 174/47
[58] Field of Search ............ 392/480, 472; 174/47

[56] References Cited

U.S. PATENT DOCUMENTS

| | | | |
|---|---|---|---|
| 2,243,220 | 5/1941 | Pitman | 392/472 |
| 2,793,280 | 5/1957 | Harvey | 392/472 X |
| 3,097,288 | 7/1963 | Dunlap | 392/472 |
| 3,378,673 | 4/1968 | Hopper | 392/472 |
| 3,522,413 | 8/1970 | Chrow | 392/472 X |
| 3,791,415 | 2/1974 | Lawless | 392/472 X |
| 3,853,149 | 12/1974 | Stine | |
| 4,264,418 | 12/1982 | Genini et al. | |
| 4,553,023 | 11/1985 | Jameson et al. | 392/472 |
| 4,667,084 | 5/1987 | Regge | 392/472 X |
| 4,921,018 | 5/1990 | Dridi et al. | |

FOREIGN PATENT DOCUMENTS

| | | | |
|---|---|---|---|
| 3332551 | 3/1985 | Germany | 392/472 |
| 1120482 | 7/1968 | United Kingdom | 392/472 |

Primary Examiner—John A. Jeffery
Attorney, Agent, or Firm—Hoffman, Wasson & Gitler

[57] ABSTRACT

A tubular conduit for the transport of fluids under pressure includes a flexible outer tubular sheath, a group of stiffening reinforcements, a flexible inner tubular sheath or tube, and if applicable at least one intermediate flexible tubular sheath, and a heater in the form of electrically conductive wires, connected to an electric power source and releasing heat by Joule effect, said wires being arranged on the length of the conduit. Also a plurality of electrically conductive wires are arranged in at least one layer in which the wires are parallel to one another and spirally wound around the axis of the conduit, the layers of conductive wires being placed between two flexible tubular sheaths of the conduit, the conductive wires being noncontiguous to one another and each resting by surface contact on the underlying tubular sheath.

24 Claims, 6 Drawing Sheets

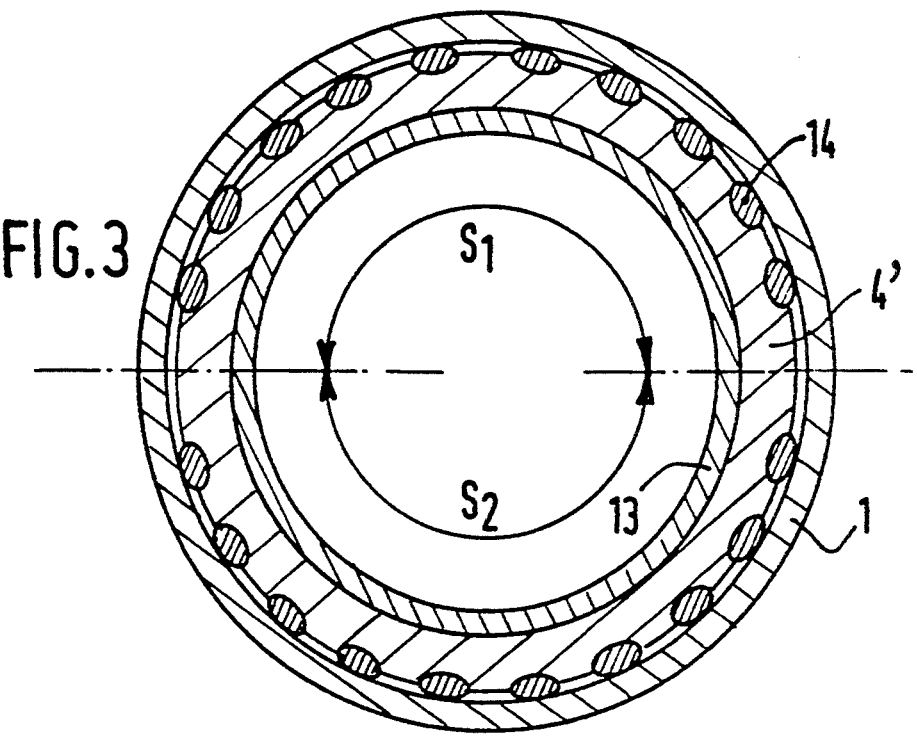

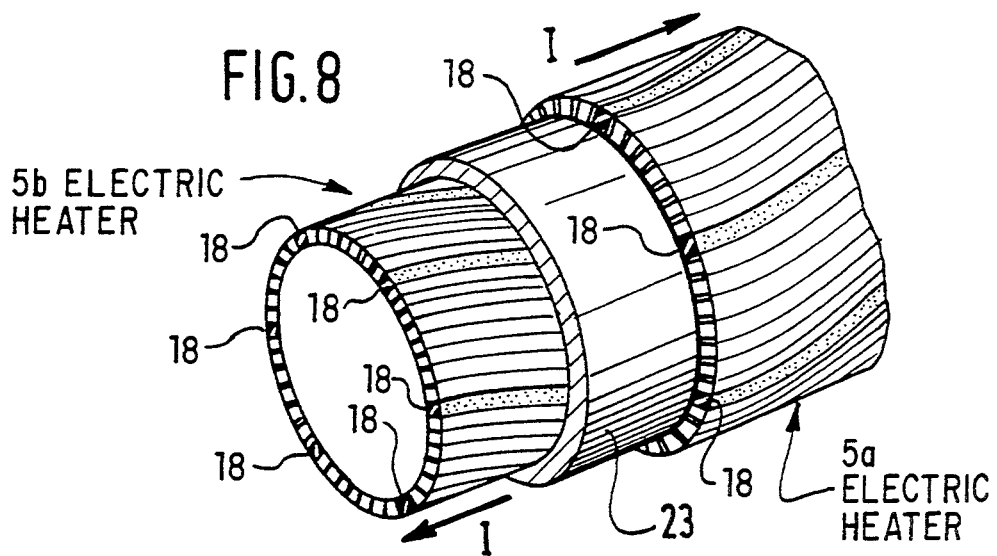
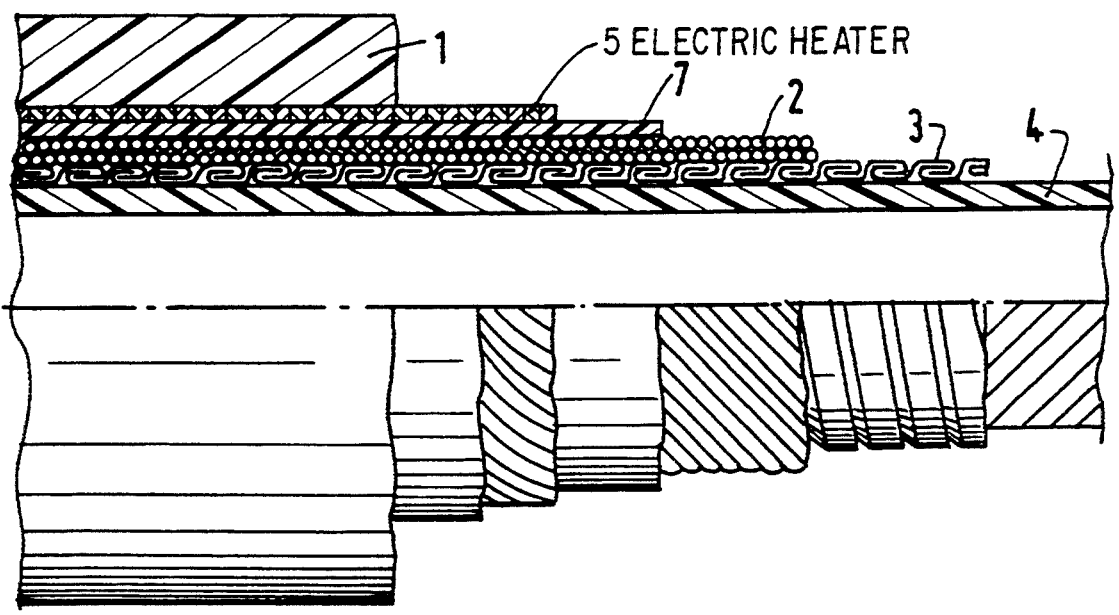

FLEXIBLE TUBULAR CONDUIT WITH HEATING MEANS AND STIFFENING MEANS FOR TRANSPORTING PRESSURIZED FLUIDS

This invention relates to a flexible tubular conduit comprising incorporated heating means and more specifically a flexible tubular conduit for the transport of liquid and/or gaseous fluids under pressure, in which the temperature of the fluid at the outlet of the conduit must be maintained approximately equal to the intake temperature despite the unavoidable heating exchanges with a relatively cold ambient environment or in which the temperature drop of the fluid transported between the intake and the outlet of the conduit must be limited to a relatively small value.

By way of examples of application of conduits according to the invention, flexible tubular conduits can becited that are used for the transport of hydrocarbons in petroleum production installations, particularly undersea (offshore) production installations or conduits for transport of hydrocarbons, particularly in the Arctic zone where it is necessary to heat the conduit continuously or else provide for a reheating of the transported fluid, for example to resume the flow after a stop that has caused a freezing up of the transported liquid.

Flexible conduits within the meaning of the invention are, of course, not limited to the transport of hydrocarbons but can also be used for the transport of various products such as natural products that must be kept at a more or less elevated temperature such as oily products, the conduits also being able to be used in other applications, for example such as sampling pipes in the refining industry or more generally in the chemical industry.

The flexible tubular conduits according to the invention are of the type comprising a protective flexible outer tubular sheath, a group of stiffening reinforcements, a flexible inner tubular sheath or tube and, if applicable, at least one intermediate flexible tubular sheath, and comprise heating means in the form of electrically conductive wires connected to an electric power source and releasing heat by Joule effect, said wires being arranged on the length of the conduit.

Numerous examples of embodiments of flexible tubular conduits using electric conductors embedded in insulating structures such as an elastomer material or sheathed conductive wires arranged along the conduit.

Known solutions provide relative satisfaction for conduits of short length not requiring elevated mechanical characteristics but are not suitable in particular for the transport of fluids such as hydrocarbons at high pressures and/or at a great depth with sections of conduits of great length, particularly greater than 1000 m.

The conduits for this purpose must in particular have elevated mechanical characteristics particularly of tensile strength, crushing strength and to the internal pressure of the transported fluid.

In addition, conductors embedded in an elastomer material, or sheaths, that are found in known heated conduits have relatively small metal sections and exhibit the drawback of being limited in terms of heat flow that can be emitted and of possible continuous conduit section length, as well as the drawback of operating at a relatively high temperature of the conductors, with poor characteristics of distribution and transmission of the heat to the transported fluid.

The applicant company has already proposed performing a heating of the transported fluid in such conduits and has thus described in its U.S. Pat. No. 4,364,418 a conduit comprising sheathed heating wires incorporated into metal shapes in the form of hollow cases interposed between the solid wires that make up a tensile strength reinforcement of the conduit.

Nevertheless, this solution which makes it possible to make a heated flexible conduit with elevated mechanical characteristics exhibits the drawback that the heating power that can be obtained is relatively limited particularly because of the low heat dissipation surface of the conductors. The maximum length of each section is relatively small, in practice, limited to 1000 m, and the production and positioning of special hollow shapes considerably increases the production cost of the flexible tubular conduit.

This invention proposes making a flexible tubular conduit that can be used particularly for the transport of fluids under pressure, comprising means for heating by Joule effect in the form of electric wires arranged along the length of the conduit and offering the advantage relative to the known solutions of transmitting to the transported fluid a heat flow that is considerably greater and well distributed around the conduit and making conduits of much greater continuous length without intermediate electrical connection independently of the connections to the two ends of each conduit section.

The flexible tubular conduit according to the invention is characterized essentially by the fact that it comprises a plurality of electrically conductive wires, arranged in at least one layer in which said wires are parallel to one another and spirally wound around the axis of the conduit, the—or each of the—layers of conductive wires being placed between two flexible tubular sheaths of the conduit, said conductive wires being noncontiguous to one another and each resting by surface contact on the underlying tubular sheath.

Thus, according to the invention, at least one heating layer or more specifically, as will be explained below, heating sectors consisting of conductive wires arranged side by side with a certain lateral functional play and exhibiting considerable heat dissipation surfaces in contact with the underlying sheath, and therefore in the direction of the transported fluid on the inside of the flexible conduit.

So as to increase the heat dissipating surface, each of the conductive wires is advantageously a metal shape, preferably non-sheathed, advantageously of solid section and of noncircular shape, for example oval, elliptical, flattened or polygonal, in particular rectangular of flat section.

The conductive wires of the—or of each—layer can be simply arranged between the surfaces opposite the sheaths between which they are positioned or, in a variant, be housed in grooves with corresponding sections made in at least one of the faces of the opposite sheaths.

This embodiment makes it possible in particular to use wires of circular section or with a section close to a circular section while providing a high heat transfer surface toward the underlying layer.

The conductive wires are connected to an electric power source at one of the ends, or optionally to each of the two ends, the connection being made by connecting wires which pass through the end fitting mounted at said end or, if applicable, both end fittings.

The electric supply of the conductive wires of the flexible tubular conduit according to the invention can occur preferably with direct current or with threephase alternating current.

In a first method of use with a direct current power supply, a single layer of conductive wires is provided. Several variant embodiments are then possible.

In a first variant embodiment, the layer is subdivided into two sectors of wires made of the same conductive material and with the same section, the sectors each extending approximately over 180°, the wires of each of the sectors being connected respectively in parallel and the wires of each of the two sectors being connected in series to the wires of the other sector.

The wires of one of the sectors provide the conduction of electric current in one direction along the flexible tubular conduit, the wires of the other sector providing the return of the current.

The different sectors are advantageously separated from one another by insulators, particularly in the form of elastomer or plastomer elongated strips placed between the conductive wires of the different sectors, additional insulation elongated strips being able to be placed between the electric conductors inside the same electrically conductive sector. Instead of the elongated strips, it is possible to provide insulating coatings of the end conductive wires on at least their face opposite the conductor of the adjacent sector. The number of the elongated strips or of the insulating coatings is nevertheless limited so that the total surface of the conductive wires in contact with the underlying sheath is greater than 30% and preferably greater than 50% of the perimeter of said sheath. In practice, it can be advantageous to select a value greater than 70% that can go up to 90%.

In a second variant embodiment, a first sector of wires supplied in parallel and made of the same conductive material and a second sector consisting of wires supplied in parallel and made of a second conductive material are provided.

By an appropriate selection of constituent metal materials of the two sectors of conductive wires, it is possible to optimize the dimensioning of the heating layer and the characteristics of the electric power supply considering the materials that can be used for making the conductive wires.

The applicant company has found that this output was optimized by using wires which, all exhibiting the same section, are in each of the sectors in a number Na and respectively Nb such that:

$$Na/Nb = \sqrt{\rho a/\rho b}$$

$\rho a$ and $\rho b$ being the resistivities of the constituent materials of the wires of the two sectors.

By way of materials that can be used for making the conductive wires of the conduits according to the invention, it is possible to cite carbon steel, stainless steel, aluminum alloys, copper or brass, it being understood that, as has just been indicated, these materials can be used to make sectors of various materials, carbon steel/stainless steel combinations; steel/aluminum alloy combinations; aluminum alloy/brass combinations; brass/copper combinations being able to be envisaged.

In a third variant embodiment, all the conductive wires of the layer are made of the same conductive material and are all arranged in parallel, the return of the electric current being made by a separate electric conductor.

In a second method of use, two layers of conductive wires are provided, each placed between two flexible tubular sheaths of the conduit, each of the layers exhibiting an arrangement as described above and being made so that the wires of one of the layers are all assembled in parallel and provide electrical conduction in one direction along the conduit, the wires of the other layer also being assembled in parallel to one another but in series relative to the wires of the first layer providing the return of the current.

In the case of a supply of threephase alternating current, it is provided in one embodiment to subdivide a single layer of electrically conductive wires into three sectors separated by insulation means, particularly plastic or elastomer rings, the wires of each sector being assembled in parallel on one phase of the electric supply.

The electrically conductive wires of the layers according to the invention can be spirally wound around the axis of the conduit according to any desired configuration that does not affect the mechanical properties of the conduit particularly with regard to flexibility, for example an "SZ" configuration, i.e., with periodic reversal of the direction of spiraling of the wires, or advantageously a spiral configuration around the conduit, the wires being wound in continuous spirals at a constant pitch.

In the case where the conduit comprises as stiffening reinforcements a weave that is resistant at the same time to traction and to the radial forces of the internal pressure, composed for example of two crossed layers each consisting of wires arranged spirally around the conduit with the same winding angle of 55° relative to the axis of the conduit, the wires of the two layers being wound with opposite angles in relation to the axis of the conduit, the constituent wires of the—or of each of the—layers of heating wires according to the invention are preferably placed on the inner sheath, inside of said weave, wound in continuous spirals exhibiting an winding angle less than 55°, the difference between this angle and 55° being able to be slight, for example a few degrees only.

Preferably, in the case where the flexible tubular conduit comprises a weave for compressive strength (pressure vault) wound by spiraling, and, on the outside of the vault, a weave for tensile strength exhibiting an winding angle less than 55°, the electrically conductive wires are placed between the pressure vault and the tensile weave, with an intermediate sheath on each side and wound in continuous spirals with an winding angle greater than that of the tensile weaves, the difference between said angles being preferably at least equal to 10°.

In every case, the temperature during use of the wires of the heating layers remains relatively low and very slightly higher than the temperature of the inner part of the wall of the flexible conduit, and than the temperature of the transported fluid, the difference being able to be, normally, less than 1° C.

It results that the advantage that the increase in temperature created by Joule effect in the conductive wires does not present any danger of subjecting the material of the plastic tubes or sheaths present in the wall of the flexible conduit to an excessive temperature.

In addition, this property of the flexible conduit according to the invention makes it possible, starting from the measurement of the electric parameters of intensity and/or of potential difference, to measure with great accuracy and continuously, at each moment, the temperature of the transported fluid, including during the temporary preliminary phase of temperature rise.

In the particular case, for example, of direct current power supply, the potential difference being fixed, the measurement of the intensity makes it possible to determine the instantaneous value of the electrical resistance of the layer of conductive wires, and consequently the value of the resistivity of its wires, which is itself a function of the actual temperature of the wires. Since the temperature of the conductive wires is very close, at each moment, to that of the transported fluid, it is therefore possible to convert directly the measurement of the current intensity into a value of the temperature of the transported fluid, the accuracy of measurement thus obtained being able to be on the order of 1° C.

By flexible tubular sheaths according to the invention, is meant the sheaths of plastic or elastomer that make up the usual structure of the flexible conduit and/or of the additional tubular sheaths put in place as part of using the invention to provide electrical insulation at the level of the layer or layers of conductive wires, at least one of the sheaths placed on the outside of the layer or layers of conductive wires before being fluidtight.

Furthermore, by sheath according to the invention, is meant not only a tubular layer put in place in a conventional way by extrusion but a layer which can be put in place in any suitable way, particularly by interlocked grain.

The flexible tubular conduit according to the invention can advantageously be equipped on its periphery with a thermal insulation structure preventing losses to the outside of the heat released by Joule effect, this insulation structure being able for example to be of the type of that described in U.S. Pat. No. 4,921,018 whose applicant company is co-holder.

Figure 2:
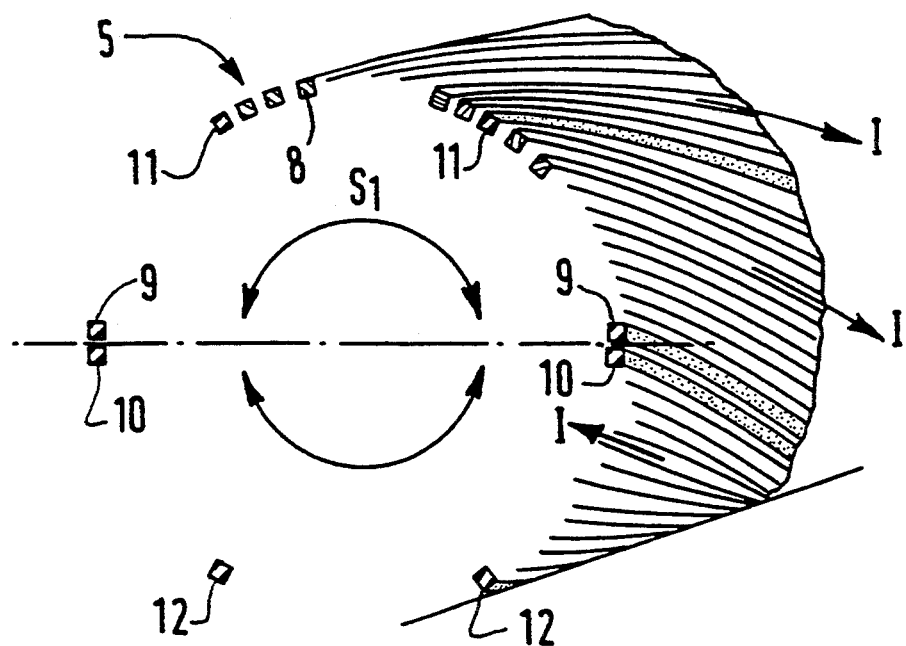
Figure 5:
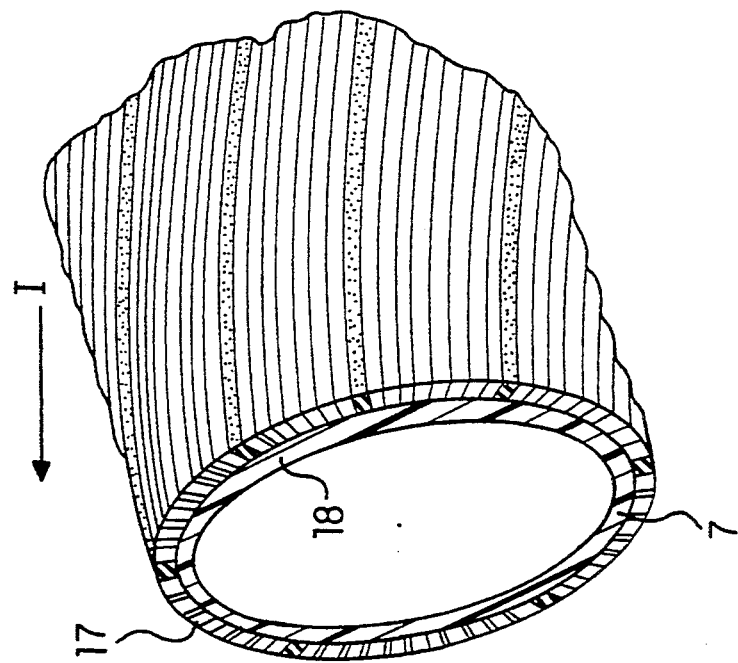
Figure 4:
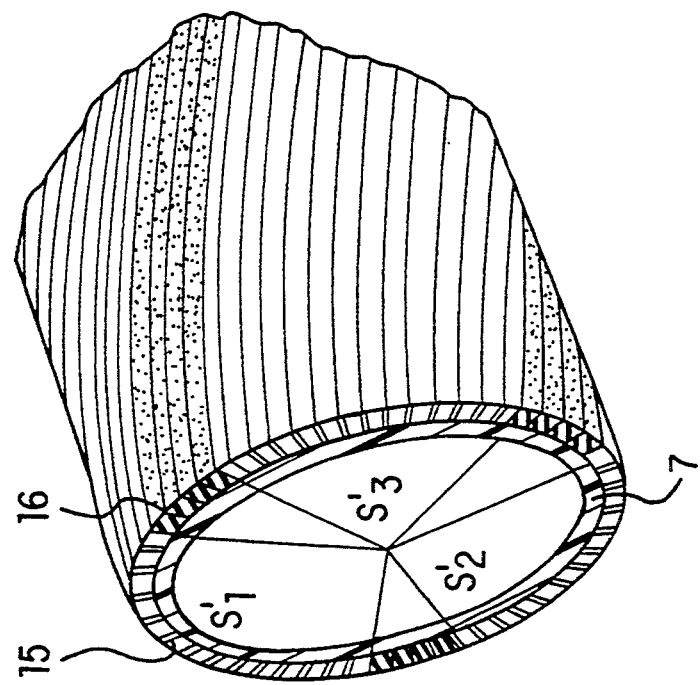
Figure 6:
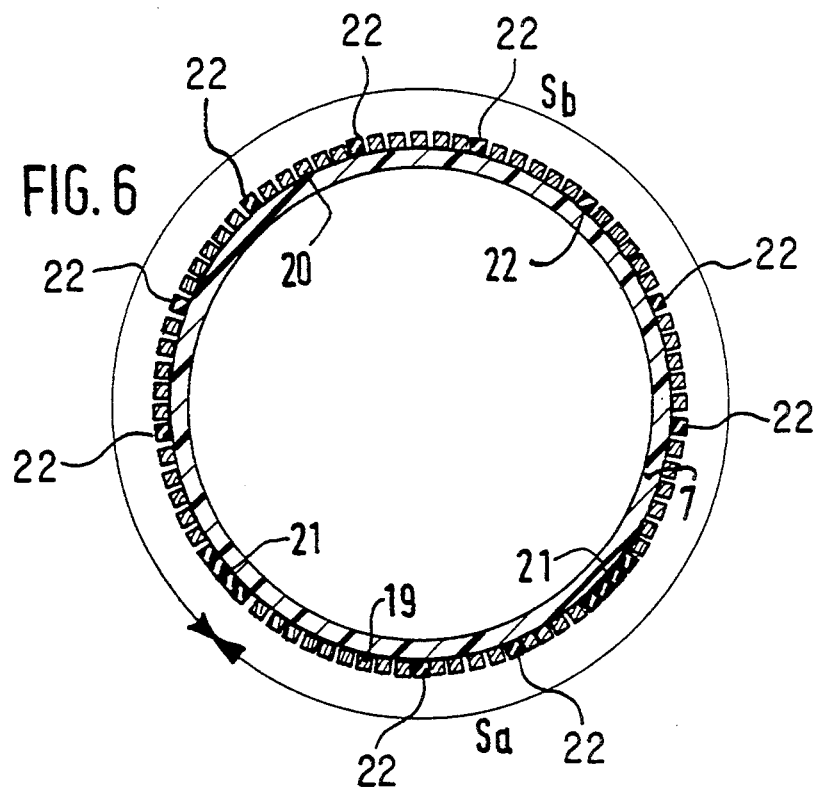
Figure 7:
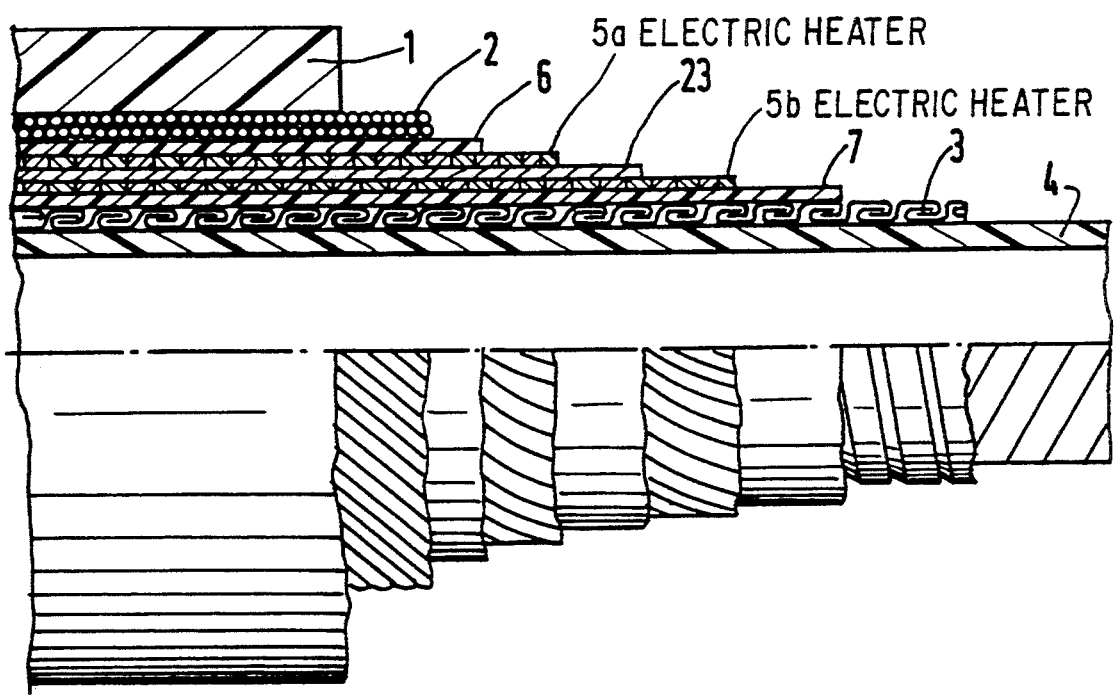
Figure 10:
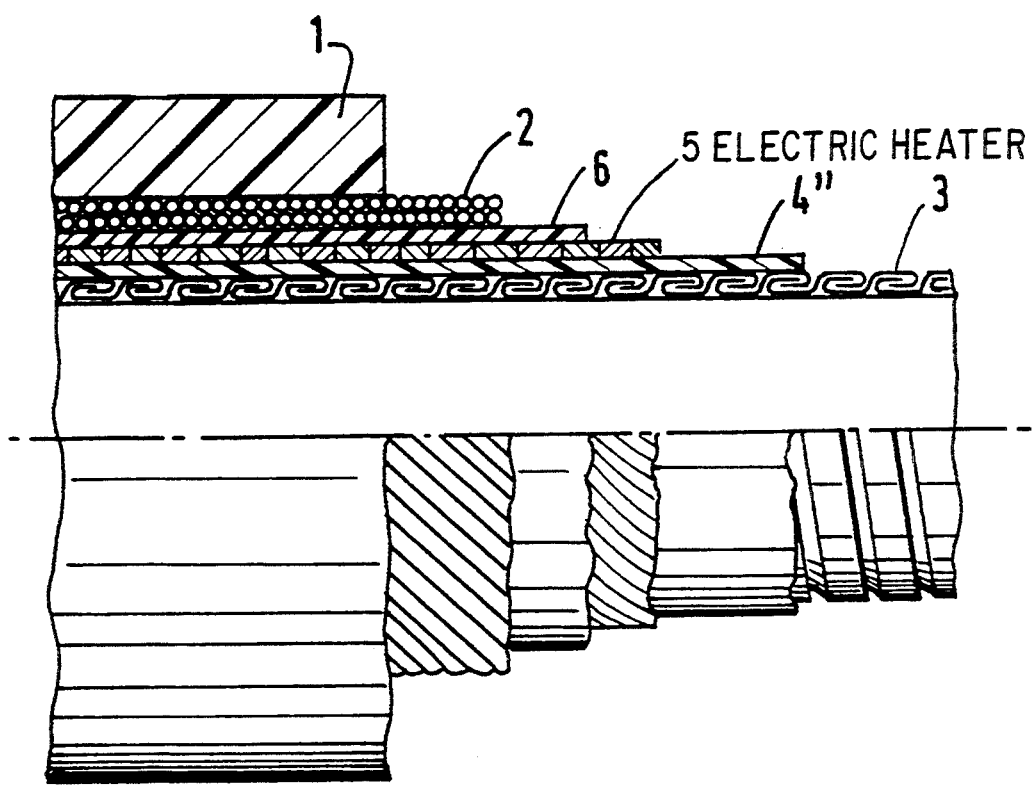

To have the invention understood better, various methods of use will now be described by way of absolutely nonlimiting examples by referring to the accompanying drawing in which:

FIG. 1 is a view partially in section and partially cut-away of a conduit structure according to the invention, FIG. 2 illustrates an example of embodiment of a heating layer according to the invention, FIG. 3 is a view in section of another example of embodiment of a flexible tubular conduit according to the invention, FIGS. 4 to 6 illustrate variants of a heating layer according to the invention, FIG. 7 illustrates, in a manner similar to FIG. 1, another conduit structure according to the invention with two heating layers, FIG. 8 illustrates an example of embodiment of a heated structure with two layers of conductive wires, FIGS. 9 and 10 are views similar to FIGS. 1 and 7 of other embodiments of flexible tubular conduits according to the invention.

In FIG. 1 an example of flexible tubular conduit that can be used, particularly for the transport of fluids under pressure such as in particular hydrocarbons produced during the operation of offshore wells, has been illustrated.

The applicant company produces and markets in great length such conduits which exhibit elevated mechanical characteristics, particularly tensile strength, crushing strength and resistance to the internal pressure of the transported fluid.

The conduit illustrated in FIG. 1 is of the "smoothbore" type and comprises a flexible outer tubular sheath 1 for example of plastic such as a polyamide, a polyethylene or a material of the group of PVDF's or of elastomer material, constituting a protective outer coating for the conduit; a weave 2 for tensile strength, consisting of two crossed layers each consisting of wires arranged spirally around the conduit with the same winding angle, the wires of the two layers being wound with opposite angles in relation to the axis of the conduit; a weave 3 for compressive resistance illustrated in the form of a layer of a clamped band but which in practice can comprise one or more layers of a clamped band or of shaped wires wound by spiraling at an angle close to 90° in relation to the axis of the conduit; and a flexible inner tube 4 of a thermoplastic material such as a polyamide or polyethylene or PVDF or other polymer.

Advantageously, flexible outer tubular sheath 1 comprises a thermal insulation layer, for example an expanded plastic, such as PVC foam, this layer being preferably framed by a fluidtight underlying sheath of solid plastic and the sheath of outer coating of the hose, also fluidtight, of solid plastic.

According to the invention, between the weave 2 of tensile strength and the weave 3 of compressive strength, there is provided a heating layer 5 interposed between two flexible tubular sheaths 6 and 7 which can also be made of a material of the same groups as the material of the inner and outer tubular sheaths, or of any material offering required electrically insulation properties, by extrusion or by winding of bands.

An example of embodiment of a heating layer 5 is illustrated in FIG. 2.

This layer 5 consists of a plurality of conductive wires 8, of rectangular section in the example illustrated, placed side by side with a certain functional play and divided into two semicircular sectors S1, S2 by insulating elongated strips 9, 10 which, in practice, can exhibit the same section as the conductive wires.

Intermediate insulation elongated strips 11, 12 can be placed between wires of the same sector.

Insulating elongated strips 9, 10 as well as intermediate elongated strips 11, 12 preferably have a thickness equal to or slightly greater than that of the conductive wires, and can have the same unit width as the conductive wires. They can be made of various plastics, such as polyamide, polyethylene, polypropylene or the like.

As diagrammed by arrows I in the drawings, the wires of sector S1 provide the conduction in one direction along the conduit, while the wires of sector S2 provide the conduction in the other direction.

By way of example, in the case of an inner diameter of the conduit of 203 mm and with an outside thermal insulation 24 mm thick, there is obtained for a flexible conduit such as shown in FIGS. 1 and 2, a temperature difference of 50° C. between the surrounding environment (seawater, for example at 15°) and the transported fluid (crude oil kept at 65° C.), with a current intensity of 250 A and a voltage drop of 392 mV per meter of conduit.

In this case conductive wires 8 of carbon steel have been adopted, of flattened rectangular section 6 mm by 1.6 mm numbering 60, wound at an angle of 55°, with an average lateral play of 5%, the winding angle of the steel wires constituting the two layers of weave 2 of tensile resistance being 35°.

It is thus possible to assure the maintenance of temperature of a continuous length of piping of 5,000 m with an electric power supply under a potential difference of 1,960 volts, by connecting one of the ends of the hose to an electric power source, for example located on a platform on the surface, or by undersea connection with the connecting conductors connected to the conductive wires of the conduit and which are mounted in the end piece and connected to a fluidtight outside connector.

With a direct electric current supply, it is also possible to use, in the example of embodiment of FIG. 1, the embodiments of heating layers illustrated in FIGS. 5 or 6 which will be described later.

FIG. 3 illustrates a simplified variant of "roughbore" structure comprising an inner casing 13 generally consisting of a helical winding with slight pitch, of one or more shapes that can be clamped, particularly steel band, this casing being intended to prevent the crushing of the flexible conduit and to protect the fluidtightness inner sheath in relation to the attacks of the transported products from the risk of implosion in case of rapid decompression during the transport of products containing gas, an inner flexible tubular sheath 4' and a flexible tubular outer sheath 1 which can be similar to the sheath with thermal insulation described with reference to FIG. 1.

In this embodiment, conductive wires 14 exhibit an approximately elliptical section and are housed on the inside of grooves formed in the periphery of inner sheath 4', however without preference being attached to it.

In this example, conductive wires 14 are also placed in two semicircular sectors S1 and S2, no additional insulation ring being provided because of the arrangement of conductive wires 14 in relation to sheaths 1 and 4' between which they are placed.

FIG. 4 illustrates an example of embodiment of a heating layer supplied with threephase current in which conductive wires 15 which can exhibit the same section as conductive wires 8 of the example of FIG. 2, that of wires 14 of the example of FIG. 3 or any suitable section are distributed in three sectors S'1, S'2, S'3 separated by groups of insulating elongated strips 16, the embodiment illustrated comprising four insulating elongated strips between the conductive wires of the three sectors, each of the sectors corresponding to one phase of the current. Because of the supply of threephase alternating current, no return means of the current has to be provided, the three sectors of wires assembled in parallel S'1, S'2, S'3 being connected to one another at the end of the flexible conduit opposite the end by which they are connected to the outside electric power source.

Layer 5 formed by the three sectors of conductive wires 15 can be placed inside the flexible structure illustrated in FIG. 10. This structure is of the "rough bore" type and comprises an inside casing 13 as defined in the case of FIG. 3, an inner fluidtightness sheath 4" resting on casing 13, and on which layer 5 of conductive wires 15 is placed. Heating layer 5 is separated by a flexible tubular intermediate sheath 6 from the two layers of we:ave 2 wound in opposite directions at 55° and that assure the resistance of the hose to the internal pressure and to the axial forces, the outer protection being provided by a flexible outer tubular sheath 1 which is advantageously made with a thermal insulation layer.

With an inside diameter of the conduit of 152 mm and an outside sheath thermal insulation 20 mm thick, it is possible to obtain a temperature difference of 50° C. In this case, there are three sectors of 18 wires each, the wires being of copper and of flattened rectangular section 6 mm ×1.6 mm and wound at an angle of 45°. In addition to the three groups of four insulating elongated strips 16 between the sectors, there is no intermediate ring between the various wires of each of the three sectors. The intensity of the current consumed is 451 effective A per phase, and it is possibe to make a continuous conduit of 3,200 m with a supply under 380 V.

The embodiment of FIG. 5 comprises groups of conductive wires 17 supplied with direct current which can exhibit the same section as those previously described or any other suitable section, divided into groups by insulating rings 18.

In this embodiment, all wires 17 are connected in parallel and provide the conduction of the current in a single direction along the length of the conduit. Because of the supply of direct current, it is necessary, for the return of the current, to provide an additional conductor (not shown) independent of the structure of the conduit and mounted in series with wires 17.

In the case of a smooth-bore structure with an inside diameter of 203 mm and with an outside sheath thermal insulation 24 mm thick, a temperature difference of 50° C. is obtained for a current intensity of 500 A. The voltage drop is then 196 mV per meter of conduit, which makes it possible to make a continuous conduit 10,000 m long with a potential difference of 1960 V. In this case, there are 60 flattened rectangular steel wires 6 mm ×1.6 mm as in FIG. 2, also wound at 55°.

In the embodiment of FIG. 6 corresponding also to a use with direct current, there are provided two sectors Sa and Sb of conductive wires 19 and respectively 20 of the same section, wires 19 and 20 being made of various metals. The two sectors Sa and Sb are separated by groups of insulating elongated strips 21. Inside each sector, the conductive wires 19 are separated, by intermediate insulating elongated strips 22.

In the case of a rough-bore structure with an inside diameter of 203 mm and with an outside sheath thermal insulation only 12 mm thick, a temperature difference of 50° C. is obtained with an intensity of 574 A and a voltage drop equal to 307 mV per meter of conduit. In this case the conductive wires 19 of sector Sa comprises 18 copper wires and the conductive wires 20 of sector Sb comprises 46 carbon steel wires, all the wires being of flattened rectangular section 6 mm ×1.6 mm, and wound at 40°, the stiffening reinforcement structure consisting of two layers of steel wires wound in opposite directions at 55° (as illustrated in FIG. 10). The insulation between the two sectors is provided by two groups of elongated strips 21 of four rings each, with in addition nine intermediate elongated strips 22 in total.

The flexible tubular conduit illustrated in FIG. 7 is similar to the one illustrated in FIG. 1 but comprises two layers of heating wires 5a and 5b between which an additional insulation sheath 23 is placed.

A detailed structure of the two heating layers which here are each of the same type as heating layer 5 illustrated in FIG. 5, are seen in FIG. 8.

With the same structure with an inside diameter of 203 mm and the same thermal insulation as for the structure of FIGS. 1 and 2, a temperature difference of 50° C. is obtained with a current intensity of 385 A and a voltage drop equal to 285 mV per meter of conduit. In this case, there are 62 steel conductive wires 19 and 6 intermediate elongated strips on layer 5a, and 66 steel conductive wires 19 and 6 intermediate elongated strips on layer 5b, the wires and the elongated strips all exhibiting the same flattened rectangular section of 6 mm ×1.6 mm.

One of the heating layers, with a direct current power supply, provides the conduction of the current in one direction along the conduit, the other layer providing the return of the current.

As a variant, each of layers 5a and 5b could have the structure illustrated in FIG. 2 (each layer comprising two sectors with opposite current directions and with the same metal for all wires), or further at least one of the two layers could have the structure illustrated in FIG. 6 (the wires of a first sector providing the conduction of the current in one direction are made from a first metal, the wires of the second sector providing the conduction of the current in the other direction being made from a different metal).

The embodiment of FIG. 9 differs essentially from the one illustrated in FIGS. 1 and 2 by the fact that heating layer 5 placed between sheaths 1 and 7 is on the outside of tensile weave 2 whereas it was on the inside of it in the embodiment of FIG. 1.

With an inside diameter of the conduit of 152 mm and an outside sheath thermal insulation of 24 mm, a direct current intensity of 95 A obtains a temperature difference of 50° C. for a voltage drop of 918 mV per meter of conduit. It is thus possible to make a continuous heated conduit with a length of 2,000 m with a power supply under 1,836 V. In this case, there are 54 stainless steel conductive wires of rectangular section of 6 mm × 1.6 mm, wound at 55°, with two groups of two insulating elongated strips each to separate the two sectors and nineteen intermediate elongated strips.

In all embodiments, the lateral play between the conductive wires placed side by side forming one or more layers correspond to the average values of the open distances between adjacent wires in the case of layers of weave with tensile strength present in the known hoses, in particular when these tensile strength wires are wires placed spirally between an inner layer and an outer layer without being embedded in an elastomer or plastic, which corresponds, for example, to the case of hoses with unbonded layers of the type produced by the applicant company. This play is determined, in particular, so that the flexible conduit maintains the integrity of its internal compressive strength and resistance to other forces applied and of its strength while exhibiting the required flexibility, and also as a function of the production requirements. The functional lateral play, under these conditions, is normally between 1% and 20%, and, preferably, between about 3% and 12%, being able to vary as a function of the winding angle (the lateral play is defined from the average value of the ratio between the width of the wire and the width occupied by a wire). The wires making up each of the layers, rest by surface contact on the underlying sheaths.

As a result of the work that it has devoted to the study of the structures of flexible conduits, the applicant company has found that this functional play is such that it makes it possible to avoid the continuous contact zones between the conductors despite the deformations imposed by the handling operations and the working conditions during operation of the conduit. It has been found that with the flexible tubular conduits according to the invention, a good circulation of the electric current. along each of the conductive wires is thus obtained and this in the various situations which can be necessary for the flexible tubular conduit during use, particularly as part of a petroleum operation, despite the handling operations, and, in particular, the internal pressure conditions, the static or dynamic distortion of the conduit, the axial load applied, the effects of crushing as well as the vibrations.

Having thus discovered that wires similar to the wires of the layers of weave for mechanical strength and arranged in a similar way can be used effectively as electrical conductors to heat the piping by Joule effect, and having found moreover that it is thus possible to achieve optimization of the conditions for transmission of the heat emitted as well as electric power supply characteristics, it therefore became possible to make conductive heating layers by using constituent elements and winding methods similar to those already used for weaves for mechanical strength, which offers a double advantage:

a) use of a proven technique which has shown its very great reliability, which is particularly important in the case of hoses with elevated mechanical characteristics for petroleum operations at sea.
   b) use of the same production means to produce the hoses, existing winding devices being able to be directly used.

In all embodiments, it is advantageous that the group of stiffening reinforcements be made so as to be able to withstand all the components of forces applied to the flexible conduit, such as the effects due to internal pressure, the effects of axial load, of outside pressure or of crushing, of torque, and that the resistance to these various components of force be mainly assured by the group of stiffening reinforcements, so that the sharing of the layer or layers of conductive wires in the resistance to the outside forces is relatively very slight, and this although said layers exhibit characteristics that are apparently identical with those of certain of the layers that make up the stiffening reinforcements. The tensile stresses to which the conductive wires can be subjected are thus limited to relatively very small values, preferably not exceeding 10% of their elastic limit. Such a result is obtained by acting on the general shape of the structure of the flexible conduit, and on the respective characteristics of the layer or layers of conductive wires and of the various layers of stiffening reinforcements, in particular, the thickness of the wires, the winding angles and, optionally, the respective Young's moduli of the wires that make up the various layers. Certain general arrangements of the structure of the flexible conduit, applicable on this account to the conduits with weaves at 55° and to the conduits with a pressure vault, have been described above. Certain existing calculating models such as those developed by the applicant company make it possible to draw up the definition of a hose structure responding to the above conditions, and to verify that the level of stress in the conductive wires is much less than the established limit in each case of application.

Thus to limit the stresses in the conductive wires presents in particular the following two advantages:
   a) to eliminate the danger of breaking of the conductive wires by exceeding stress or by fatigue. Actually it has been found that, to maintain the performances of the heated flexible conduit according to the invention stable over time, it is important to be assured that there is no danger of breaking of one of the conductive wires.
   b) it is possible to achieve, independently and under the best conditic. ns, the optimization of the various characteristics of the layers of conductive wires:

arrangement and number of layers, shape and dimensions of the sections of conductive wires, winding angle, nature of the material, etc. whereas other stresses of dimensioning would have to be taken into account if the conductive wires had had to share in the mechanical strength of the flexible conduit. Improved technical performances and more advantageous economical results are thus obtained by separating the respective roles of the heating layers and of the mechanical strength layers.

According to the invention and in contrast with known embodiments, it is not necessary to provide separate electric power supplies on sections of short length of the conduit, the transmission of the current being performed from the first end of the first section up to the last end of the second section without requiring power supply at the level of the connections of the sections to one another, which makes it possible to make, with a single electric power supply, considerable lengths of lines of several kilometers.

The inside diameter of the flexible conduits according to the invention can, typically, be between 20 mm and 500 mm, and the most current applications that can be envisaged can correspond to diameters varying from 60 mm to 300 mm, with internal pressures that can reach elevated values, on the order of 100 to 1000 bars or more as a function of the diameters.

Although the invention has been described in connection with particular embodiments, it is quite obvious that it is in no way limited to them and that it is possible to bring to it various variants and modification without thereby going outside of either its scope or its spirit.

I claim:

1. A flexible tubular conduit for the transport of fluid under pressure comprising a flexible outer tubular sheath, a flexible inner tubular sheath, and at least one intermediate flexible tubular sheath, a group of stiffening reinforcements disposed outside said inner tubular sheath and inside said intermediate flexible tubular sheath, and heating means in the form of a plurality of electrically conductive wires, connectable to an electric power source for releasing heat by Joule effect, said wires being arranged on the length of the conduit in at least one layer in which said wires of each layer are parallel to one another and spirally wound around the longitudinal axis of the conduit, each of said at least one layer of conduit wires being placed between two of said inner, outer and intermediate flexible tubular sheaths of the conduit, said wires of each layer being freely movable and unbounded to the inner, outer and intermediate flexible tubular sheaths, said electrically conductive wires being noncontiguous to one another with a lateral play in the range of 1% to 20% between adjacent wires and each of said at least one layer of conductive wires resting by surface contact on an underlying tubular sheath.

2. A conduit according to claim 1, wherein each of the conductive wires is a metal shape of solid section.

3. A conduit according to claim 2, wherein each of the conductive wires is a nonsheathed metal shape.

4. A conduit according to claim 1, wherein the electric wires exhibit a flattened rectangular polygonal section.

5. A conduit according to claim 1, wherein the conductive wires are adapted to be connected to a direct current source.

6. A conduit according to claim 5, comprising a single layer of conductive wires.

7. A conduit according to claim 5, wherein at least one of said at least one layer of conductive wires is subdivided into two sectors of wires made of the same conductive material and of the same section, the sectors each extending approximately over 180°, the wires of each of the sectors being arranged respectively in parallel and the wires of each of the two sectors being connected in series to the wires of the other sector.

8. A conduit according to claim 7, wherein the various sectors are separated from one another by insulators, in the form of one of an elastomeric and plastomeric elongated strips placed between the conductive wires of the different sectors.

9. A conduit according to claim 5, wherein at least one of said at least one layer of conductive wires is subdivided into a first sector (Sa) of wires supplied in parallel and made of the same conductive material and a second sector (Sb) consisting of wires supplied in parallel and made of a second conductive material.

10. A conduit according to claim 8, wherein number Na and respectively Nb of the wires of the two sectors (Sa) and respectively (Sb) is such that:

$$Na/Nb = \sqrt{\rho a/\rho b}$$

$\rho a$ and $\rho b$ being the resistivities of the constituent materials of the wires of the two sectors.

11. A conduit according to claim 1, wherein all the conductive wires ofs aid at least one conductive layer are made of the same conductive material and are arranged in parallel.

12. A conduit according to claim 1, comprising two layers of conductive wires, each placed between two of said flexible inner, outer and intermediate flexible tubular sheaths of the conduit, the wires of one of the layers being all assembled in parallel and providing the electric conduction in one direction along the conduit, the wires of the other layer also being assembled in parallel to one another but in series in relation to the wires of the first layer and providing the return of the current.

13. A conduit according to claim 1, wherein the conductive wires of the conduit are connectable to three phase alternating current power supply, the conduit comprising a single layer of electrically conductive wires subdivided into three sectors, the wires of each sector being connectable in parallel to a different phase of the electric supply.

14. A conduit according to claim 12, wherein the three sectors are separated from one another by insulators, in the form of one of elastomeric and plastomeric elongated strips placed between the conductive wires of the different sectors.

15. A conduit according to claim 1, wherein insulators, in the form of one elastomeric and plastomeric elongated strips are placed between wires conductive wires providing conduction in the same direction.

16. A conduit according to claim 1, wherein the conductive wires are wound in continuous spirals with a constant pitch.

17. A conduit according to claim 1, wherein the conductive wires of the at least one layer are made so that the mechanical stresses induced in said wires by the forces imposed on the conduit are slight.

18. A conduit according to claim 1, in which the group of stiffening reinforcements comprises a weave made of wires arranged spirally around the conduit with the same winding angle of 55° relative to the longitudinal axis of the conduit, wherein the wires of each of said at least one layer of conductive wires are placed on the underlying inner sheath of the conduit, inside said weave, and wound in continuous spirals exhibiting a winding angle of less than 55°.

19. A conduit according to claim 1, in which the group of stiffening reinforcements comprises a weave for compressive strength wound by spiraling, and, on the outside of said weave for compressive strength, a weave for tensile strength formed by wires exhibiting a winding angle less than 55°, wherein the wires of said heating at least one heating layer are placed between said weaves, with interposition of intermediate sheaths and wound in continuous spirals with a winding angle greater than that of the wires of the weave for tensile resistance, the difference between said angles being preferably at least equal to 10°.

20. A conduit according to claim 1, wherein the temperature of said wires is kept at a relatively small value and greater than the temperature of the internal surface of said inner tubular sheath of the flexible conduit.

21. A conduit according to claim 1, wherein the wires of said at least one layer of conductive wires are used to measure the temperature of the transported fluid.

22. A conduit according to claim 1, wherein at least one outside thermal insulation layer is disposed inside said outer flexible tubular sheath.

23. A conduit as recited in claim 1, wherein the lateral play between the adjacent wires is in the range of 3% to 12%.

24. A flexible tubular conduit for the transport of fluid under pressure comprising a flexible outer tubular sheath, a flexible inner tubular sheath, and electric heating means in the form of a plurality of electrically conductive wires connectable to an electric power source for releasing heat by the Joule effect, said wires being arranged on the length of the conduit wherein said electric heating means comprises a plurality of electrically conductive wires arranged in one layer in which said wires are parallel to one another and spirally wound around the longitudinal axis of the conduit, said one layer of electric wires being placed between said inner and outer flexible tubular sheaths of the conduit, said one layer of conductive wires being unbound so as to be freely movable relative to said inner and outer flexible tubular sheaths, said conductive wires being noncontiguous of one another with a lateral play in the range of 1% to 20% between adjacent wires and resting by surface contact on an underlying tubular sheath.

* * * * *